(No Model.) 3 Sheets—Sheet 3.
E. M. BURR & J. W. STIPES.
MACHINE FOR CUTTING BRICKS OR TILES.
No. 368,929. Patented Aug. 30, 1887.
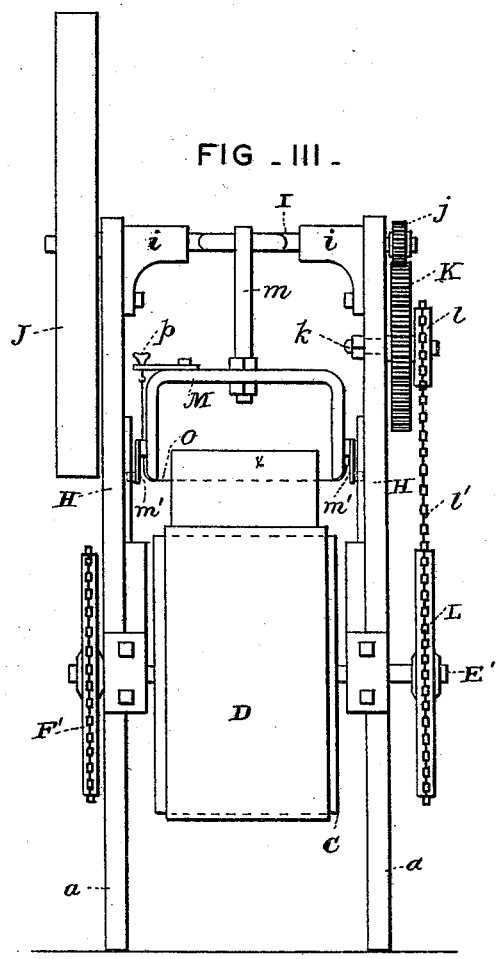
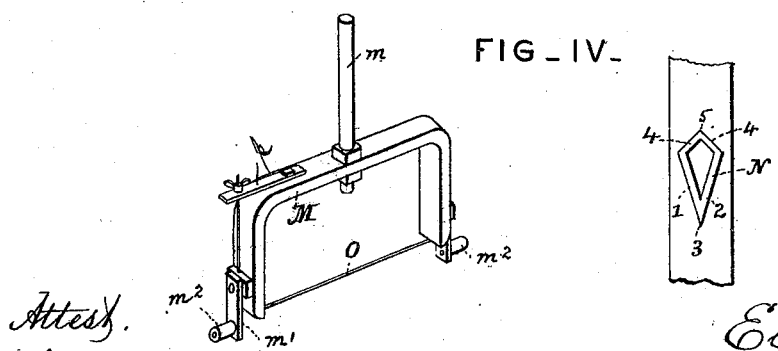

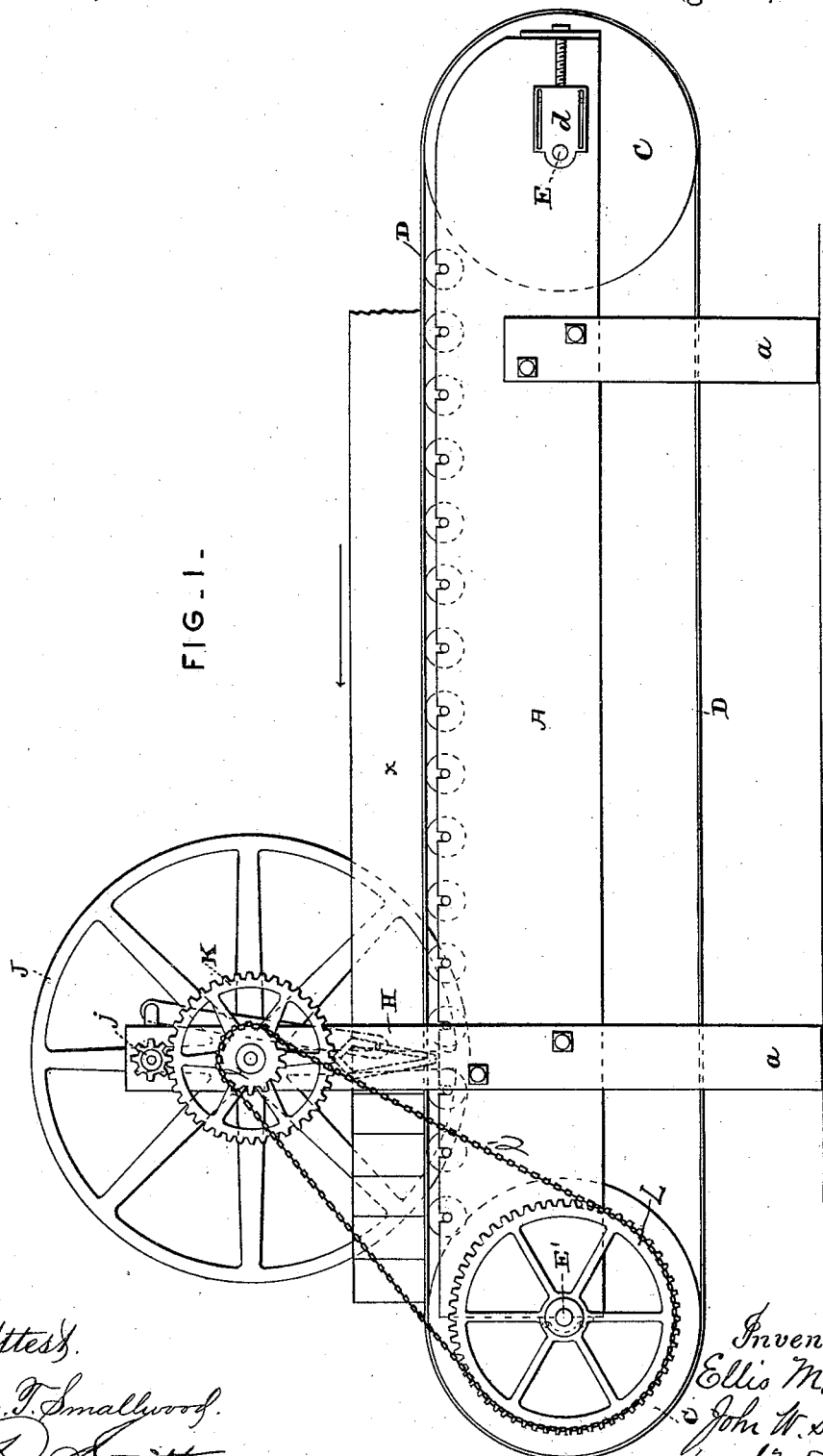

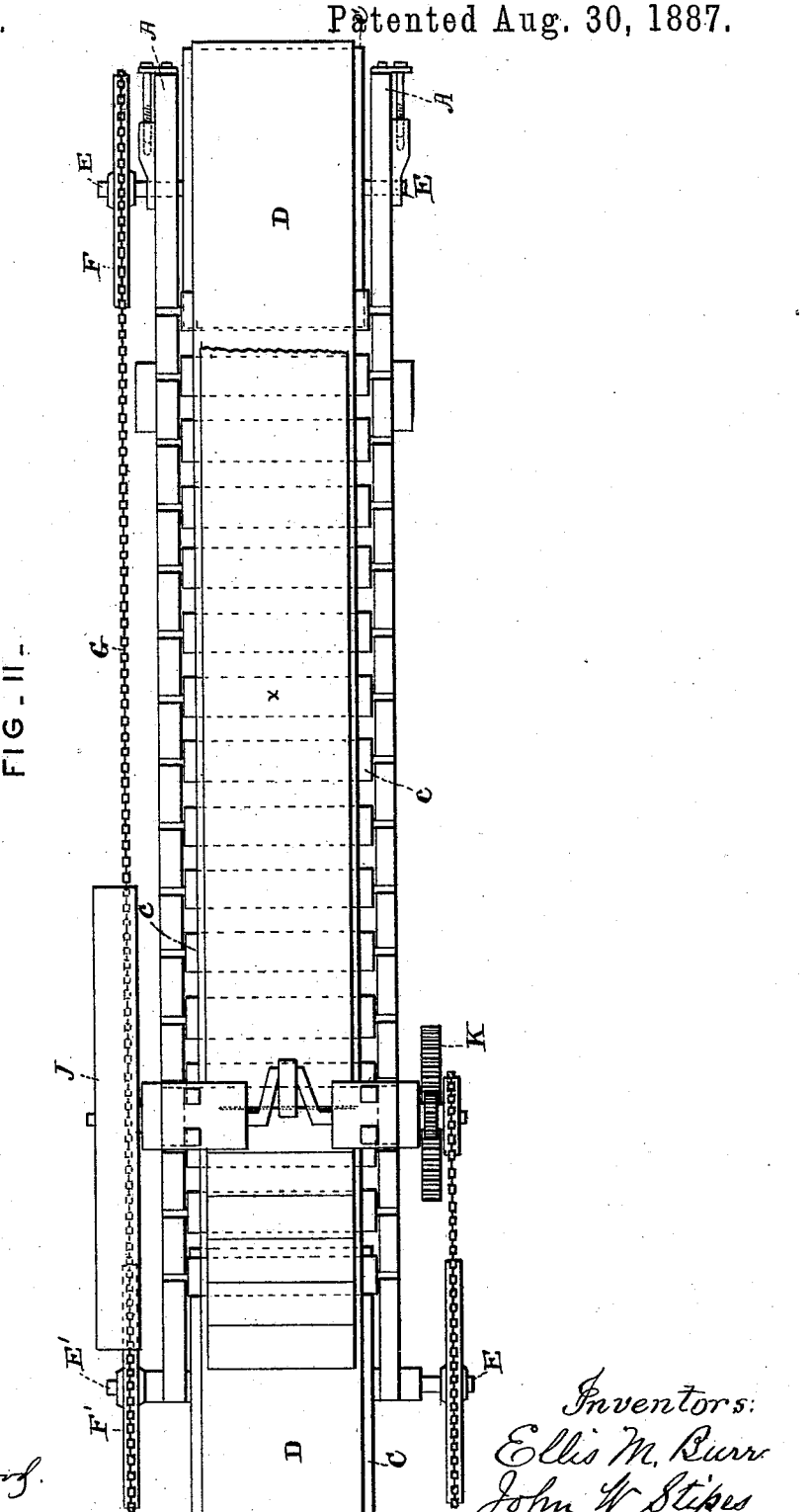

UNITED STATES PATENT OFFICE.

ELLIS M. BURR AND JOHN W. STIPES, OF CHAMPAIGN, ILLINOIS.

MACHINE FOR CUTTING BRICKS OR TILES.

SPECIFICATION forming part of Letters Patent No. 368,929, dated August 30, 1887.

Application filed January 14, 1887. Serial No. 224,357. (No model.)

*To all whom it may concern:*

Be it known that we, ELLIS M. BURR and JOHN W. STIPES, both of Champaign, county of Champaign, and State of Illinois, have invented a new and useful Improvement in Machines for Cutting Bricks or Tiles, of which the following is a full, clear, and exact description, reference being had to the accompanying drawings, making part of this specification.

Our invention relates to machines for turning out bricks, tiles, &c., in the green or plastic state preparatory to burning in the kiln, and its object is to simplify the operation of making the brick and tile forms and to render such operation more rapid and uniform than has heretofore been possible.

To the above purposes our invention consists in a brick or tile cutting machine in which the plastic material is carried along horizontally in a block or continuous mass which is regularly divided by a vertically-acting cutter moving in unison with the carrier and operatively connected therewith.

Our invention further consists in the peculiar and novel arrangement of the cutting mechanism, whereby the continuous horizontal movement of the carrier and the vertical reciprocating movements of the cutter insure the proper vertical cutting of the block of plastic material.

Our invention further consists in certain peculiar and novel features of construction and arrangement of parts, as hereinafter described and claimed.

In order that our invention may be fully understood, we will proceed to describe it with reference to the accompanying drawings, in which—

Figure 1 is a side elevation of a brick or tile cutting machine constructed in accordance with our invention. Fig. 2 is a plan view, and Fig. 3 is a front end elevation of the same. Fig. 4 illustrates in detached condition the cutter-carrier and one of the guiding-cams therefor.

In the said drawings, A designates two longitudinal side pieces, which are placed parallel with each other and suitably supported at their ends upon legs $a$, said pieces being suitably braced together to form the bed or framework of the machine. At each end of the frame is mounted a drum, C, the axles of which are journaled transversely of the frame in the side pieces, A. An endless belt, D, runs over these drums C and its upper strand is supported against sagging by a series of rollers, $c$, which are journaled transversely upon the upper edges of the side pieces, A. In order to maintain the desired tension of the belt D the axles of the rear drum C are provided with adjustable journals, one of which is shown at $d$ in Fig. 1. The axle E of the rear drum C carries at one end a sprocket-wheel, F, over which runs a drive-chain, G, leading to and passing around a similar sprocket-wheel, F', on the corresponding end of the axle E' of the front drum C. By this arrangement the two drums are caused to revolve exactly in unison, so that the belt D is moved along at a uniform rate of speed.

The legs $a$ at the front end of the machine are extended upward to form standards H H, as shown, and in the upper ends of these standards is journaled in boxes $i$ a crank-shaft, I, as best shown in Figs. 2 and 3. At one end this crank-shaft I carries a balance-wheel, J, designed to steady the motion of the machine, and at its opposite end said shaft carries a gear-pinion, $j$. The teeth of the pinion $j$ mesh with the teeth of a gear-wheel, K, which is mounted upon the stub-shaft $k$, secured to one of the standards H, as best shown in Fig. 3. A sprocket-pinion, $l$, is mounted upon the stub-shaft $k$, and a drive-chain, $l'$, runs from the pinion $l$ to a sprocket-wheel, L, mounted upon the opposite end of the axle E' from that which carries the sprocket-wheel F', before referred to.

M designates a yoke or inverted-U-shaped frame which is connected by a link, $m$, to the crank-section of the shaft I. Each arm of the yoke carries upon its outer side, near the lower extremity thereof, a downwardly-extending L-shaped arm, $m'$, having on its lower extremity an outwardly-extending friction-roller, $m^2$, said rollers working in guiding-cams N, to be hereinafter more particularly described.

O designates a wire which is secured at one end to one arm of the yoke M, and the other end of which is carried upward and is connected with an adjusting-screw, $p$, upon the cross-piece of said yoke. Thus the wire O is stretched tightly across the lower end of the yoke and serves as the cutter for the machine.

It will be seen from the above description that while the carrier-belt D moves steadily along in the direction of the arrow, Fig. 1, the yoke reciprocates vertically. The mass of plastic material, in the form of a block or hollow cylinder, is placed or fed upon the apron, as shown at $x$, and is steadily moved toward and under the yoke by the force given to it by the brick or tile machine. It is necessary that the wire in passing downward through the mass should make a clean cut and when rising out of the mass should pass directly through the cut just made, and in order to accomplish this result without interrupting the continuous movement of the belt and the material thereon I provide the guiding-cams N, before referred to, and mount said cams upon the inner sides of the standard H in such proximity to the lower ends of the yoke-arms as to permit the rollers $m^2$ to work in the grooves of said cams.

As shown in Fig. 4, the groove is approximately diamond-shaped, with its lower portions, 1 2, converging at their lower ends to an acute angle at 3, and its upper portions, 4, converging at their upper ends to an obtuse angle at 5. Thus, as the mass of material is moved along, the wire or cutter O will cut vertically downward through the material and return through the same cut without interrupting the movement of the mass. When the cutting-wire strikes the belt D at the end of the downward movement of the cutter frame or yoke, the movement of the apron carries the cutter past the center of the angle 3 of the guide-cam, so that the cutter may rise in the grooves 1.

When other than plain forms are to be produced, the shape of the cams may be varied or the relation of the grooves altered without departing from the spirit of our invention.

This machine may be used upon plastic materials other than clay, and is rapid and uniform in its action.

Having thus described our invention, what we claim as new, and desire to secure by Letters Patent, is—

1. In a brick and tile cutting machine, the combination, with the continuously-moving horizontal carrier, of the vertically-reciprocating cutter geared to and operated from said moving carrier, and fixed ways for controlling the horizontal movements of said cutter, substantially as and for the purpose described.

2. The combination, with an endless carrying-belt and drums for supporting the same, of a drive-chain connecting said drums operatively together, a crank-shaft operatively geared to one of said drums, a vertically-reciprocating cutter-frame connected to said crank-shaft, and a guiding-cam operatively connected to the cutter-frame, so as to deflect the movement of the cutter to produce the desired cut without interrupting the movement of the carrier, substantially as set forth.

3. The combination, with the frame A, carrying the drums C and standards H, of the sprocket-gearing between said drums, the crank-shaft upon said standards, the sprocket-gearing between said drums and shaft, the yoke-frame connected to the crank-shaft and carrying the cutting-wire, and the guiding-cams N, for deflecting the movements of the cutter, substantially as described.

In testimony whereof we have hereunto set our hands this 10th day of January, A. D. 1887.

ELLIS M. BURR.
JOHN W. STIPES.

Witnesses:
W. G. PARR,
E. K. WELSHLY.